United States Patent
Joel

(10) Patent No.: US 11,100,133 B2
(45) Date of Patent: Aug. 24, 2021

(54) DATA REPLICATION SYSTEM

(71) Applicant: Martin Louis Joel, Boulder City, NV (US)

(72) Inventor: Martin Louis Joel, Boulder City, NV (US)

(*) Notice: Subject to any disclaimer, the term of this patent is extended or adjusted under 35 U.S.C. 154(b) by 196 days.

(21) Appl. No.: 16/514,098

(22) Filed: Jul. 17, 2019

(65) Prior Publication Data
US 2020/0042535 A1 Feb. 6, 2020

Related U.S. Application Data

(60) Provisional application No. 62/714,645, filed on Aug. 3, 2018.

(51) Int. Cl.
*G06F 16/27* (2019.01)
*G06F 16/23* (2019.01)

(52) U.S. Cl.
CPC ........ *G06F 16/273* (2019.01); *G06F 16/2322* (2019.01); *G06F 16/2358* (2019.01); *G06F 16/2365* (2019.01)

(58) Field of Classification Search
CPC ............... G06F 16/273; G06F 16/2365; G06F 16/2358; G06F 16/2322; G06F 11/2094; G06F 11/2097; G06F 11/2071
USPC ........................................ 707/613
See application file for complete search history.

(56) References Cited

U.S. PATENT DOCUMENTS

| | | | |
|---|---|---|---|
| 7,103,586 B2 | 9/2006 | Holenstein et al. | |
| 2009/0307286 A1* | 12/2009 | Laffin | G06F 11/1456 |
| 2012/0203742 A1* | 8/2012 | Goodman | G06F 16/122 |
| | | | 707/646 |
| 2014/0244581 A1* | 8/2014 | Rath | G06F 16/273 |
| | | | 707/623 |
| 2015/0301901 A1* | 10/2015 | Rath | G06F 11/1451 |
| | | | 707/634 |

OTHER PUBLICATIONS

Ricardo Jimenez-Peris, Deterministic Scheduling for Transactional Multithreaded Replicas, Technical University of Madrid, , Published prior to application filing date, Spain.

* cited by examiner

*Primary Examiner* — Michael Pham
(74) *Attorney, Agent, or Firm* — Louis Ventre, Jr.

(57) ABSTRACT

An improved data replication system with goals of Recovery Point Objective of zero, meaning a zero potential for loss of data, and a Recovery Time Objective in the seconds, meaning very short downtime after a failure. The system includes duplicates of a data set preferably on multiple drives in multiple computers. Change requests are stored within duplicates, and when a change request has been stored in enough duplicates, it may be applied to any duplicate after all prior change requests have been applied to that duplicate. The system applies changes to duplicates of a data set in the same order. The system further includes a replicator operable to implement accessing and changing steps to meet the goals.

5 Claims, 13 Drawing Sheets

| Replicator | Online? | Highest Sequence Number Stored | UTC of Highest Stored | Highest Sequence Number Applied |
|---|---|---|---|---|
| 1 | YES | 101 | … 21:19:32.886 | 101 |
| 2 | YES | 101 | … 21:19:32.886 | 100 |
| 3 | YES | 101 | … 21:19:32.886 | 80 |
| 4 | NO | 50 | … 00:29:12.210 | 50 |
| 5 | NO | 50 | … 00:29:12.210 | 40 |

801

| Replicator | Online? | Highest Sequence Number Stored | UTC of Highest Stored | Highest Sequence Number Applied |
|---|---|---|---|---|
| 1 | YES | 101 | … 21:19:32.886 | 100 |
| 2 | YES | 100 | … 21:10:00.101 | 100 |
| 3 | YES | 100 | … 21:10:00.101 | 80 |
| 4 | NO | 50 | … 00:29:12.210 | 50 |
| 5 | NO | 50 | … 00:29:12.210 | 40 |

| Replicator | Online? | Highest Sequence Number Stored | UTC of Highest Stored | Highest Sequence Number Applied |
|---|---|---|---|---|
| 1 | YES | 101 | … 21:19:32.886 | 100 |
| 2 | YES | 101 | … 21:19:32.886 | 100 |
| 3 | YES | 63 | … 08:44:51.028 | 61 |
| 4 | NO | 50 | … 00:29:12.210 | 50 |
| 5 | NO | 50 | … 00:29:12.210 | 40 |

901

| Replicator | Online? | Highest Sequence Number Stored | UTC of Highest Stored | Highest Sequence Number Applied |
|---|---|---|---|---|
| 1 | NO | 101 | … 21:19:32.886 | 100 |
| 2 | NO | 101 | … 21:19:32.886 | 100 |
| 3 | YES | 101 | … 21:22:00.101 | 100 |
| 4 | YES | 101 | … 21:22:00.101 | 50 |
| 5 | YES | 50 | … 00:29:12.210 | 40 |

902

| Replicator | Online? | Highest Sequence Number Stored | UTC of Highest Stored | Highest Sequence Number Applied |
|---|---|---|---|---|
| 1 | YES | 101 | … 21:31:00.999 | 101 |
| 2 | YES | 101 | … 21:31:00.999 | 100 |
| 3 | NO | 101 | … 21:22:00.101 | 100 |
| 4 | NO | 101 | … 21:22:00.101 | 50 |
| 5 | YES | 101 | … 21:31:00.999 | 45 |

| Assigning step: assigning unique metadata to each request to change a data set, said unique metadata specifying a sequence to apply each request to change said data set    1023 |

↓

| Unique metadata limitation: the unique metadata, which is assigned to each request to change the data set, comprises a timestamp, and wherein the replicator is further operable to implement a step performed after any duplicate in the plurality of duplicates of the data set has become accessible by the replicator such that: if the replicator is able to access information of at least a quorum of the duplicates of the data set, and if any such duplicate contains a request to change the data set that has not been applied on any of the duplicates of the data set that are so accessible, and if the timestamp in the unique metadata of such a request to change the data set is newer than that of every request to change the data set that has already been applied on every such duplicate, and if said timestamp is newer than that of every request to change the data set that has not already been applied on every such duplicate, then such request to change the data set is processed as if it were the latest in the sequence, and if any other duplicates in the plurality of duplicates of the data set are not so accessible, then the unique metadata of such request to change the data set is assigned a new current timestamp    1123 |

| Replicator: a replicator, the replicator operable in one or more computers or programmable logic devices, wherein the replicator is operable to implement steps    1020 |

↓

| Request preclusion step: the replicator is further operable to implement a step comprising preventing applying, in any duplicate in the plurality of duplicates of a data set, any request to change the data set that has not been applied in any such duplicate and that predates any later request to change the data set that has been applied in any such duplicate    1120 |

FIG.11

| | |
|---|---|
| Replicator: a replicator, the replicator operable in one or more computers or programmable logic devices, wherein the replicator is operable to implement steps | 1020 |
| Changes limitation: the replicator is further programmed with code to perform steps comprising: applying in any duplicate of any data set each request to change that data set; and storing an updated indication that shows that said request to change that data set was applied last in said duplicate; and wherein said applying step and said storing step are undertaken within a single atomic transaction | 1220 |

| | |
|---|---|
| Data retrieval step: processing a retrieval request for data of a data set | 1021 |
| Time lag limitation: The retrieval request for data of the data set is subject to a limitation of a maximum amount of time that the duplicate used for a response may be lagging behind in applying change requests, the limitation selected from the group consisting of | 1221 |
| Request value: a value within the retrieval request | 1222 |
| Last value: a value, sent in the last retrieval request which contained such a value, that is re-used for any subsequent retrieval request that does not contain any such value | 1223 |
| Message value: a value sent in a message which sets a default for any subsequent retrieval request that does not contain such a value | 1224 |
| Requestor value: a value stored in the data set, which is for a particular requestor or for a group of requestors in which the particular requestor is a member, and which is used when no such value has been sent in any message | 1225 |
| Data set value: a value stored in the data set, which is used when no other value has been sent in any message, and when no such value is stored for a particular requestor or any group of requestors in which the particular requestor is a member | 1226 |
| Default value: a value used when no such value is stored in the data set and when no such value has been sent in any message | 1227 |

FIG.12

DATA REPLICATION SYSTEM

CROSS-REFERENCE TO RELATED APPLICATION

This application claims the benefit of U.S. Provisional Application No. 62/714,645, filed 3 Aug. 2018, which is hereby incorporated by reference herein.

TECHNICAL FIELD

In the field of data processing, an improved data replication system with a Recovery Point Objective of zero, meaning a zero potential for loss of data, and a Recovery Time Objective in the seconds, meaning very short downtime after a failure.

BACKGROUND ART

There are numerous methods for mitigating the risks of data loss and downtime. However, currently, only synchronous and semi-synchronous replication can eliminate the risk of data loss, meaning that they provide a zero Recovery Point Objective.

Replication can occur between drives of a single computer, between drives of a storage device, or more often between drives of different computers. Replication (whether synchronous or asynchronous) means that changes to a data set (such as a database) are sent from one device or computer (referred to as the master) to another (referred to as the slave), where those changes are applied, resulting in identical copies of the data set.

With synchronous replication, the change request is written to storage but not yet applied until the slave notifies the master that the change request has been stored, at which point the master applies the change and directs the slave to apply it.

With semi-synchronous replication, there is a group of devices or computers, each with a replica of a data set, and rather than waiting until all slaves have confirmed that the change request has been stored before the master approves that it can be applied, it only waits until at least half of the slaves have confirmed.

SUMMARY OF INVENTION

A system for improving computer operations and data safety is disclosed. The system enables data replication with improved data loss prevention and time to recovery. The system includes duplicates of a data set preferably on multiple drives in multiple computers. The system permits any one duplicate to be changed so that its data set no longer exactly matches the data set on a second duplicate. The system further includes a replicator operable to implement steps. These steps include: processing a retrieval request for data of the data set; processing a request to change the data set; assigning unique metadata to each request to change the data set; storing in any duplicate of the data set a representation of each request to change that data set and the unique metadata assigned to each such request to change that data set; storing in any duplicate of the data set an indication of which request to change that data set was applied last in the duplicate; determining when a request to change the data set is eligible to be applied in the other duplicates of the data set based on the request to change the data set having been stored within at least a quorum of duplicates of the data set; and applying each request to change the data set in any duplicate of the data set after each such request to change the data set has been determined to be eligible to be applied.

Optionally, the unique metadata of each request to change the data set comprises a timestamp that may be changed conditions permitting.

Optionally, the replicator prevents applying any request to change the data set that predates any later request to change the data set that has been applied in any such duplicate.

Optionally, the replicator applies each request to change the data set and stores an updated indication within a single atomic transaction.

Optionally, the system has a maximum amount of time that the duplicate used for a response may be lagging behind in applying change requests, and/or a data set could have such a maximum, and/or a message could set such a maximum, and/or a data retrieval request could contain such a maximum.

Technical Problem

The enemies of data are data loss and downtime. These can be caused by hardware failure, data center outage, or data center damage.

The terms Disaster Recovery and High Availability are used to describe various mitigation methods to these risks. The metric for the risk of data loss is called the Recovery Point Objective.

The Recovery Point Objective specifies the amount of time recent data changes could possibly be lost if something bad happens. For example, if a database is backed up every hour, then up to an hour's worth of data could be lost, which means a Recovery Point Objective of one hour. A Recovery Point Objective of zero means no possible loss of data.

The metric for the risk of downtime is called the Recovery Time Objective. It specifies how long data could be inaccessible after something bad happens. The lower the Recovery Time Objective, the shorter the possible length of downtime. For example, if it takes up to four hours to detect a failure and resolve it (such as having an IT worker configure a new server, restore the data to that server, and change the data center's name server to the new server's IP address), then that environment would have a four-hour Recovery Time Objective.

It's important to note that even with synchronous or semi-synchronous replication, if it is between devices or computers within a single data center, then data center damage can result in all data being lost.

Most replication options (such as log shipping) are asynchronous, which results in each replica lagging behind some from the master database, and which can result in some amount of data loss. Some database servers offer synchronous replication but once a failure occurs, reconfiguration is required to make the new master replicate to another replica (if any), and for catch-up, uses asynchronous replication.

While a Recovery Time Objective of zero is impossible, the amount of time to detect and fail over after an incident can be small enough that it can be unnoticeable by humans. To achieve such a low Recovery Time Objective, in the seconds, requires standby equipment, such as a standby database server which is storing replicated data.

While some database management systems are capable of synchronous or semi-synchronous geo-replication, with automatic failure detection and failover, they tend to be too expensive for most businesses. Additionally, while some such database management systems claim a Recovery Time Objective in the seconds, if a client application accesses a database by domain name, after that name's authoritative Domain Name System (DNS) server is notified of the new IP address of the server that was changed from a slave to the master for a failover, it can take up to 48 hours for the domain name servers of the world to contain the new address, causing applications to fail during that transition period, which must be included in the true Recovery Time Objective.

Another consideration for a Disaster Recovery or High Availability configuration is that when the master fails, and a slave becomes the new master, unless there is another slave to receive changes from the new master, changes to the new master are at risk of data loss, and if changes are prevented until another such slave has been set up, that can greatly increase the Recovery Time Objective.

Solution to Problem

The solution is a system of hardware components, software components and data components. The system preferably replicates at least one data set (such as a database, drive, drive partition, or collection of files and/or directories) among multiple storage devices, with a Recovery Point Objective of zero (meaning no possible loss of data) and a Recovery Time Objective (the maximum downtime for a fail-over process) in the seconds.

The system includes a component, referred to herein as a replicator, which facilitates the data replication. This may be a hardware component, a software component, or a combination of hardware and software components. Preferably, a separate replicator is assigned to each duplicate of a data set.

When the system disclosed herein has multiple replicators, a master replicator preferably coordinates the initiation of new change requests. Preferably, in a system in which networked replicators work together to replicate a data set, for any data set, there is no more than one replicator that may serve as master at any time, that master is chosen unambiguously from among the replicators, and the master replicator so chosen preferably uses messaging between the replicators to determine when a new change request may be applied.

Client applications send messages to replicators, for modifying data in and/or retrieving data from a data set.

Preferably, modification requests are stored within their data set's replicas, and are applied to replicas of their data set in sequential order.

Optionally, for each modification request, the master replicator forwards the request to the slave replicators of the group, and after the request has been stored by a majority of replicators in the group, the master replicator applies the change to its replica of the data set, and notifies each slave that the request should be applied to their replica of the data set after all previous changes of that data set have been applied in sequential order.

After a data set replica has been restored from a backup, or after having recovered from an outage, the replica will not contain the most recent modification requests. Such a slave may retrieve such missing modification requests, and apply them in sequential order. During such a time, however, the slave is able to receive and store new modification requests, thus contributing to the majority of replicators that must store a new modification request before it can be applied.

Advantageous Effects of Invention

Some implementations disclosed herein provide a software system for the replication of a data set (such as a database, drive, drive partition, or collection of files and/or directories), with a Recovery Point Objective of zero and a Recovery Time Objective in the seconds.

Some implementations disclosed herein are a single-master data replication system (which avoids the data corruption risks inherent in multi-master systems, and a condition that can occur in multi-master systems called "split brain," in which two groups of replicas are unable to communicate and each group is applying different change requests), using semi-synchronous writing of modification requests (which is as safe as synchronous but faster), and in which modifications are applied asynchronously (which is faster and more resilient than synchronous modification).

Some implementations disclosed herein make it possible to sustain a Recovery Point Objective of zero and a Recovery Time Objective in the seconds, even if a data center that houses a replica of a data set is obliterated.

A replicator can be lagging behind, such as after recovering from an outage, and almost immediately be able to store new change requests and thus satisfying the minimum replicas before a change request may be applied. This allows semi-synchronous storage and the asynchronous application of changes, whereas other systems use either asynchronous replication (which could allow data loss to occur), or synchronous or semi-synchronous replication (in which the replicas must apply the changes synchronously, which causes slow-downs, and which requires the replicas to be up to date).

Instead of connecting using domain-name-based URLs, client applications can connect to any of the replicators by IP address, so it isn't subject to DNS domain name server propagation delays.

The system has broadest application for geo-replication (replication among replicas at least 500 miles apart) and for zero risk of data loss, and for minimal downtime. Importantly, it may also be used within a single storage device, or with a single computer, or within a single data center.

BRIEF DESCRIPTION OF DRAWINGS

The accompanying drawings, which are incorporated herein and form part of the specification, illustrate preferred embodiments of the present disclosure and, together with the description, further serve to explain the principles of the disclosure and to enable a person skilled in the relevant art(s) to make and use the techniques described throughout the disclosure.

FIG. 8 depicts several starting conditions for the replicators of a data set, for the purpose of describing several problematic edge cases, and how they are resolved, in accordance with an embodiment of the present disclosure.

FIG. 9 depicts several progressive conditions of the replicators of a data set, for the purpose of describing a problematic edge case, and how it is resolved, in accordance with an embodiment of the present disclosure.

FIG. 11 illustrates optional limitations and conditions applicable to the metadata and replicator in the system as shown in FIG. 10.

FIG. 12 illustrates optional limitations applicable to the replicator in the system as shown in FIG. 10 and further illustrates optional limitations to a processing step performed by the replicator.

DESCRIPTION OF EMBODIMENTS

Figure 1:
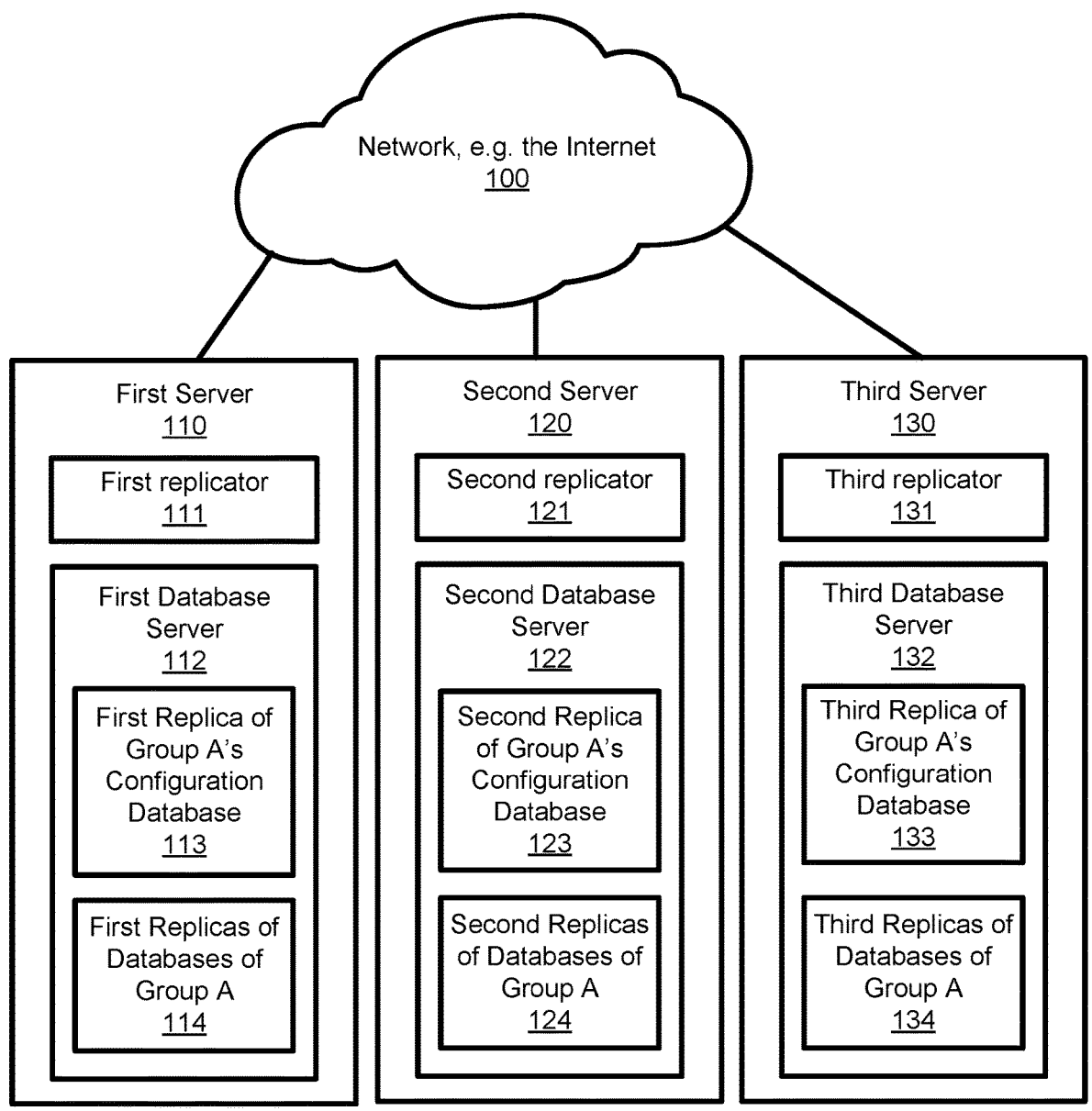
FIG. 1 illustrates a minimum configuration, in accordance with an embodiment of the present disclosure.

In the following description, reference is made to the accompanying drawings, which form a part hereof and which illustrate several embodiments of the present invention. In the drawings, like reference numbers generally indicate identical, functionally similar, and/or structurally similar elements. The drawings and the preferred embodiments of the invention are presented with the understanding that the present invention is susceptible of embodiments in many different forms and, therefore, other embodiments may be utilized, and structural and operational changes may be made, without departing from the scope of the present invention.

Definitions

The following terminology is used throughout this description.

A data set is a collection of data that is replicated as a unit, such as a database, drive, drive partition, or collection of files and/or directories.

A replicator is an instance of a software component or a hardware component or hardware and software component that performs data set replication and implements changes to data in one or more data sets, which may for example include data inserts, data updates, and data deletion.

A duplicate, also referred to interchangeably herein as a "replica," is a single copy of a data set. Although the word "replica" or "duplicate" usually implies a copy of an original, where the original is not considered a replica or a duplicate, in the present disclosure there is no concept of an original. Additionally, although the words "replica" or "duplicate" usually means an identical copy, in the present disclosure the replicas or duplicates of a data set should be identical, but at any moment, replicas or duplicates may be different because some change requests may not yet have been applied to all replicas or duplicates. In addition, in embodiments in which change requests can possibly contain non-deterministic instructions, execution of such instructions would result in replica or duplicate differences. In addition, in embodiments in which data retrieval requests can possibly contain instructions that modify data, execution of such instructions could result in replica or duplicate differences.

A replication group is a set of replicators that work together in performing data set replication.

A master, in embodiments with a master/slave configuration, is a replicator able to initiate data modifications to a data set.

A slave, in embodiments with a master/slave configuration, is a replicator that isn't able to initiate data modifications to a data set.

A quorum is a designated number of replicas of a data set, or a designated set of replicas of a data set, in which a change request must be stored before that change request is eligible to be applied to the replicas of that data set.

PREFERRED EMBODIMENTS

The following conditions apply to all preferred embodiments of the present disclosure.

A quorum condition is used to determine if a change request has been stored in enough of a data set's replicas, for that change request to be eligible to be applied to that data set's replicas, expressed for example as a simple minimum quantity or percentage or rule (e.g. a majority of a data set's replicas), or one or more sets of replicas, or a Boolean expression that specifies one or more sets of replicas.

While the present disclosure could be used with two replicas, it would be better to use three or more replicas, so that if one becomes unavailable, modifications to the data set may continue uninterrupted.

Changes to a replica may only be performed by a replicator.

Within each replica is a collection of modification requests and their corresponding IDs that indicate sequence (such as sequential numbers and/or timestamps), and info that indicates which change requests have been applied to that replica (such as by storing the ID of the last change request applied to that replica, or by flagging each change request in the collection as to whether it has been applied to that replica).

A change request may not be applied to any replica until that change request has been stored within enough replicas to satisfy the quorum condition.

Changes are applied in the same sequential order to each replica of a data set.

Applying a change request to a replica is accompanied by a change to that replica that indicates that the change request has been applied.

Client applications may communicate, either directly or indirectly, with at least one replicator of its data set.

Example 1

For the following exemplary embodiment, which is illustrated in FIG. 1 through FIG. 9, the requirements governing the system include:

a quorum must consist of at least a majority (more than half) of the number of replicas in a data set's replication group;

a separate replicator is assigned to each replica of a data set;

changes to a replica may only be performed by the replicator assigned to that replica;

within each replica is a collection of modification requests and their corresponding IDs, which are expressed as a sequence number and a timestamp;

a change request may not be applied to any replica until that change request has been stored within a quorum of the replicas of its data set, thereby assuring that for any combination of a quorum of the replicas of its data set, at least one replica contains each change request;

applying a change request to a replica is accompanied by storing that change request's ID as the highest change request applied to that replica, and the application of the change request and the storage of its ID are performed within a transaction having ACID characteristics (Atomicity, Consistency, Isolation, Durability);

at any moment, there can be no more than one master of a data set;

for a replicator to be the master for a data set, that replicator must be able to communicate with at least half of the other replicators of that data set (as determined, for example, through connected TCP/IP sockets, or recent communications such as heartbeat messages), and in the event that multiple replicators qualify to be the master, the master will be unambiguously selected (such as through use of a priority order, or a negotiation process based upon some criteria);

after the master of a data set has applied all change requests previously approved to be applied, the master applies each new change request to its replica as soon as the change request has been stored within a quorum of replicas of that data set (which must include the master's replica); and any slave may be lagging behind in its applying change requests to its replica.

FIG. 1 illustrates a configuration with three replicators. While replication could be performed between two replicas, it would be better to use three or more replicas, so that if one becomes unavailable, modifications to the data set may continue uninterrupted, thus assuring a low Recovery Time Objective. Replicators communicate over a network (100). By using the Internet, the replicators can be far from one another, thereby supporting geo-replication, which protects a data set even if an entire city is destroyed, including the data center that houses a replica.

As shown in the FIG. 1, each replicator (first replicator (111), second replicator (121) and third replicator (131)), is running within a server (first server (110), second server (120) and third server (130)). The use of ordinal numbers herein, such as "first" and "second," is intended to designate a different name and not to convey the numerical position of a step or object.

A database server (first database server (112), second database server (122) and third database server (132), is running on each server. Each database server holds a replica of the group A configuration database (first replica of group A's configuration database (113), second replica of group A's configuration database (123), and third replica of group A's configuration database (133)), that contains information about the replicators in that replication group and the databases they replicate. Each database server also contains replicas of each replicated database of group A (first replicas of databases of group A (114), second replicas of databases of group A (124) and third replicas of databases of group A (134)). Changes to the replication group configuration database are also replicated among its replication group. The configuration of FIG. 1 is merely one possible configuration.

Figure 2:
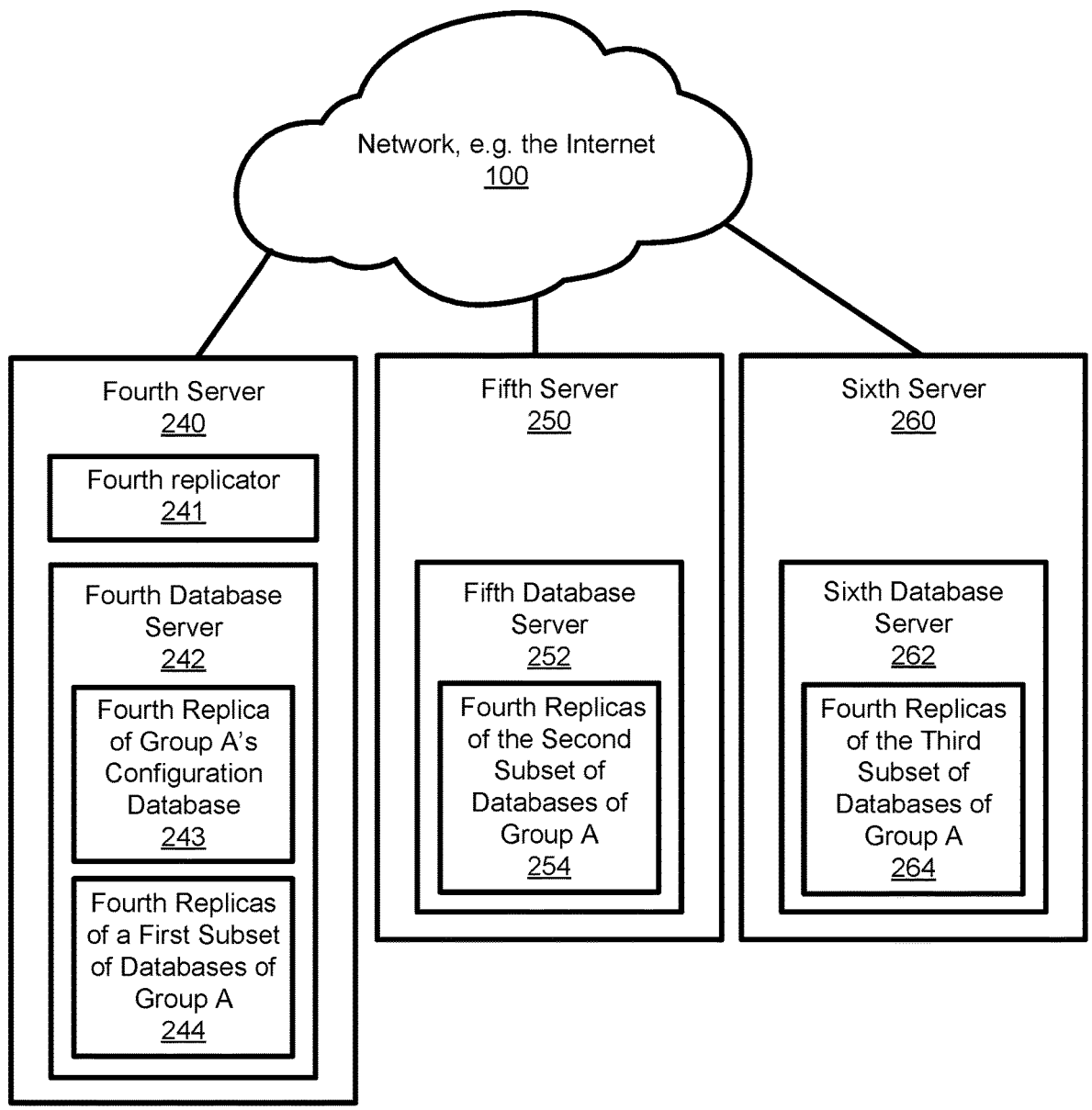
FIG. 2 illustrates an embodiment of the present disclosure in which the data replication system performs replication of databases on multiple database servers.

FIG. 2, for example, shows a replicator in which its replicas are stored on three separate database servers. The fourth replicator (241) on the fourth server (240) replicates a fourth replica of group A's configuration database (243) and the fourth replicas of a first subset of databases of group A (244), on fourth database server (242), and also the fourth replicas of the second subset of databases of group A (254) on fifth database server (252) on fifth server (250), as well as the fourth replicas of the third subset of databases of group A (264) on sixth database server (262) on sixth server (260).

Other configurations are possible. A replicator can belong to multiple replication groups. For example, one replicator could replicate a group of data sets among a group of 3 replicators, and also replicate another group of data sets among a group of 5 replicators.

Figure 3:
FIG. 3 illustrates tables added to a database to facilitate replication, in accordance with an embodiment of the present disclosure.

FIG. 3 illustrates tables added to a database to facilitate replication. While these tables exist in each replica of a data set, changes to them are not replicated among the replicas, because they contain data specific to the replica they're within. A first table (301) holds a collection of change requests. For each change request stored in the table, the table also holds the sequence number assigned by the master, and the date and time when the master received the request, in Universal Time Coordinated (UTC). A second table (302) holds the sequence number of the last change request that was applied to that replica. In the example depicted by this figure, this replica was offline for several hours, and after coming back online, newer change requests were stored. This replicator will retrieve the missing change requests from other replicators, and start applying them in order.

Figure 4:
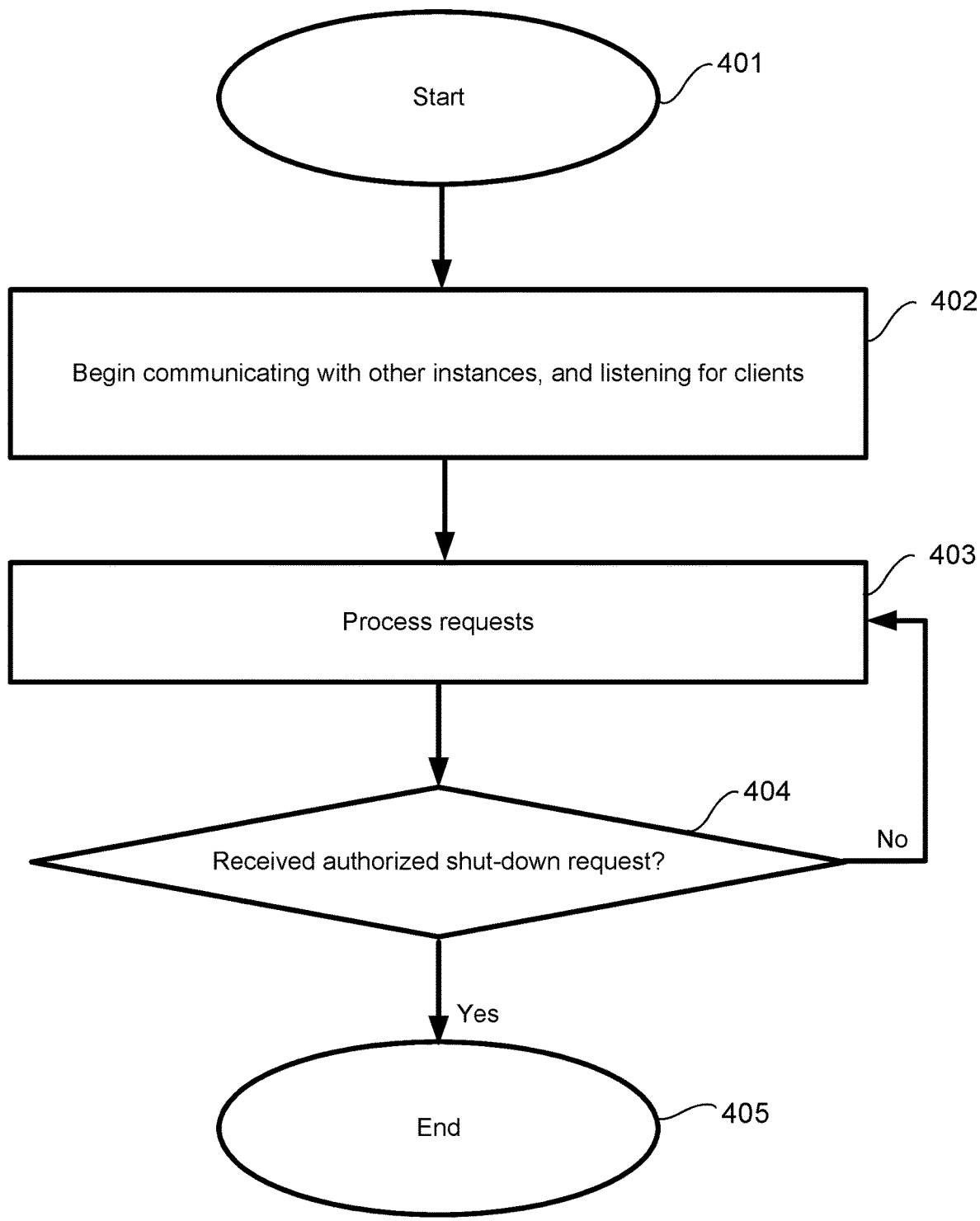
FIG. 4 is a flowchart illustrating the high-level flow of the lifespan of the data replication system, in accordance with an embodiment of the present disclosure.

FIG. 4 is a flowchart illustrating the high-level flow of the lifespan of a replicator. After a replicator starts (401), it establishes communications with the other replicators of the replication groups to which it belongs (402) via Transport Layer Security (TLS), and starts listening for connections from client applications. It then processes requests (403) from client applications and other replicators, until it receives an authorized shut-down request (404), at which time the replicator stops, i.e. the process ends (405).

Figure 5:
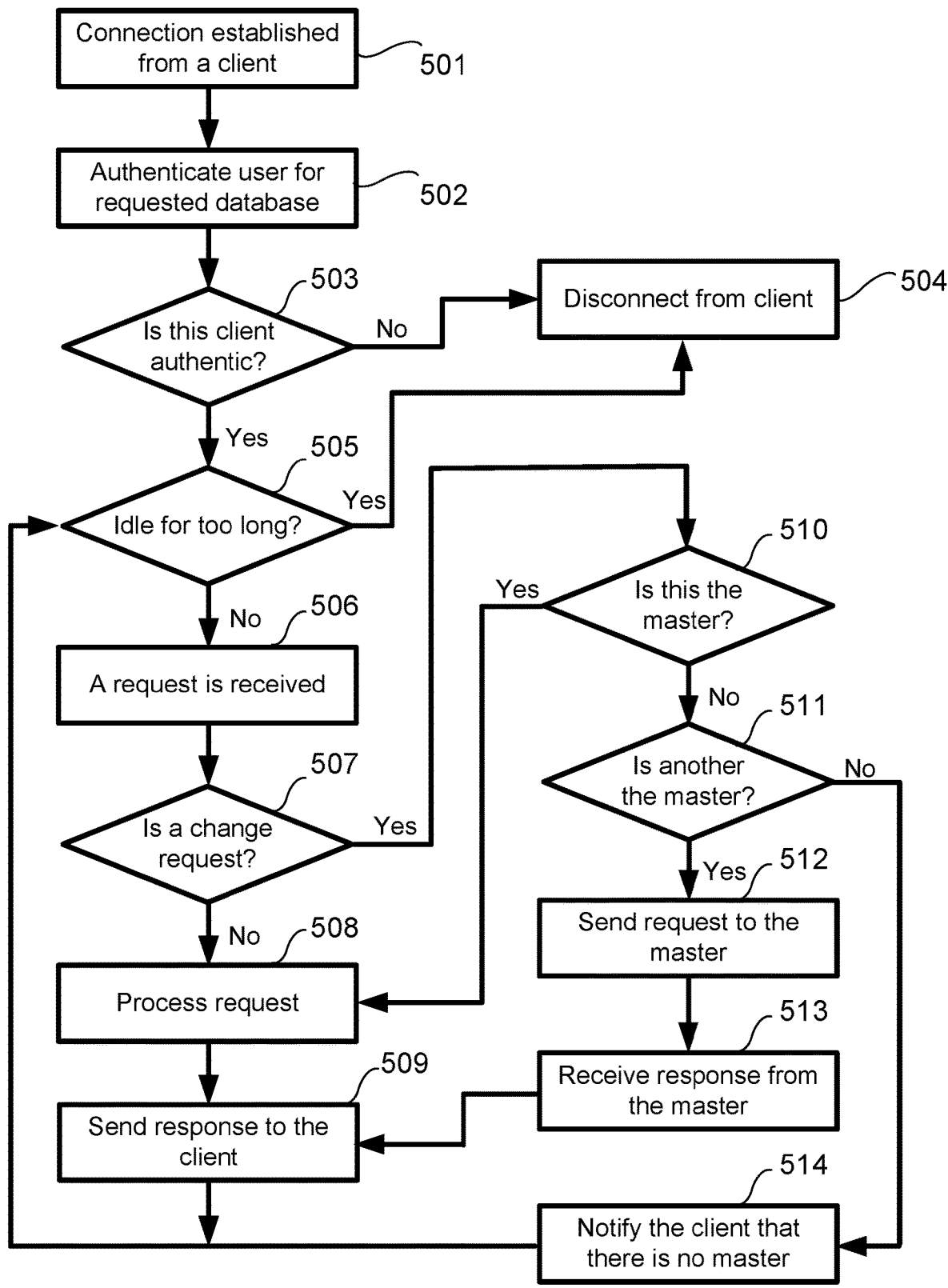
FIG. 5 is a flowchart illustrating the actions of the software, after a client application has established a connection, in accordance with an embodiment of the present disclosure.

FIG. 5 is a flowchart illustrating the high-level actions of a replicator, after a client application has established a connection. After a connection is established from a client application (501), which is performed using TLS, the client is authenticated for the requested data set (502). The client application sends the data set ID and user ID to the replicator, receives back the salt bytes for that user, and sends the password that has been encrypted using that salt.

In cryptography, a salt is random data that is used as an additional input to a one-way function that "hashes" data, a password or passphrase. Salts are closely related to the concept of nonce. The primary function of salts is to defend against dictionary attacks or against its hashed equivalent, a pre-computed rainbow table attack.

Salts are used to safeguard passwords in storage. Historically a password was stored in plaintext on a system, but over time additional safeguards developed to protect a user's password against being read from the system. A salt is one of those methods.

A new salt is randomly generated for each password. In a typical setting, the salt and the password (or its version after Key stretching) are concatenated and processed with a cryptographic hash function, and the resulting output (but not the original password) is stored with the salt in a database. Hashing allows for later authentication without keeping and therefore risking the plaintext password in the event that the authentication data store is compromised.

If the client fails authentication (503), the replicator sends a code indicating the invalid authentication, and then the replicator disconnects (504). Any time that the client application has been idle for too long (505), the replicator disconnects (504). When a request is received (506), except for a change request (507), the replicator processes the request (508), and sends a response to the client application (509). When a replicator receives a change request (507) from a client, if that replicator is the master (510), it processes the request (508) and sends the response to the client application (509). However, if the replicator is not the master, and if there is no (511) master, then the client application is notified (514). If that replicator is not the master (510), then the change request is sent (512) to the master to process, and when the response is received back (513) from the master, the replicator returns the response received back (513) from the master to the client application (509).

Figure 6:
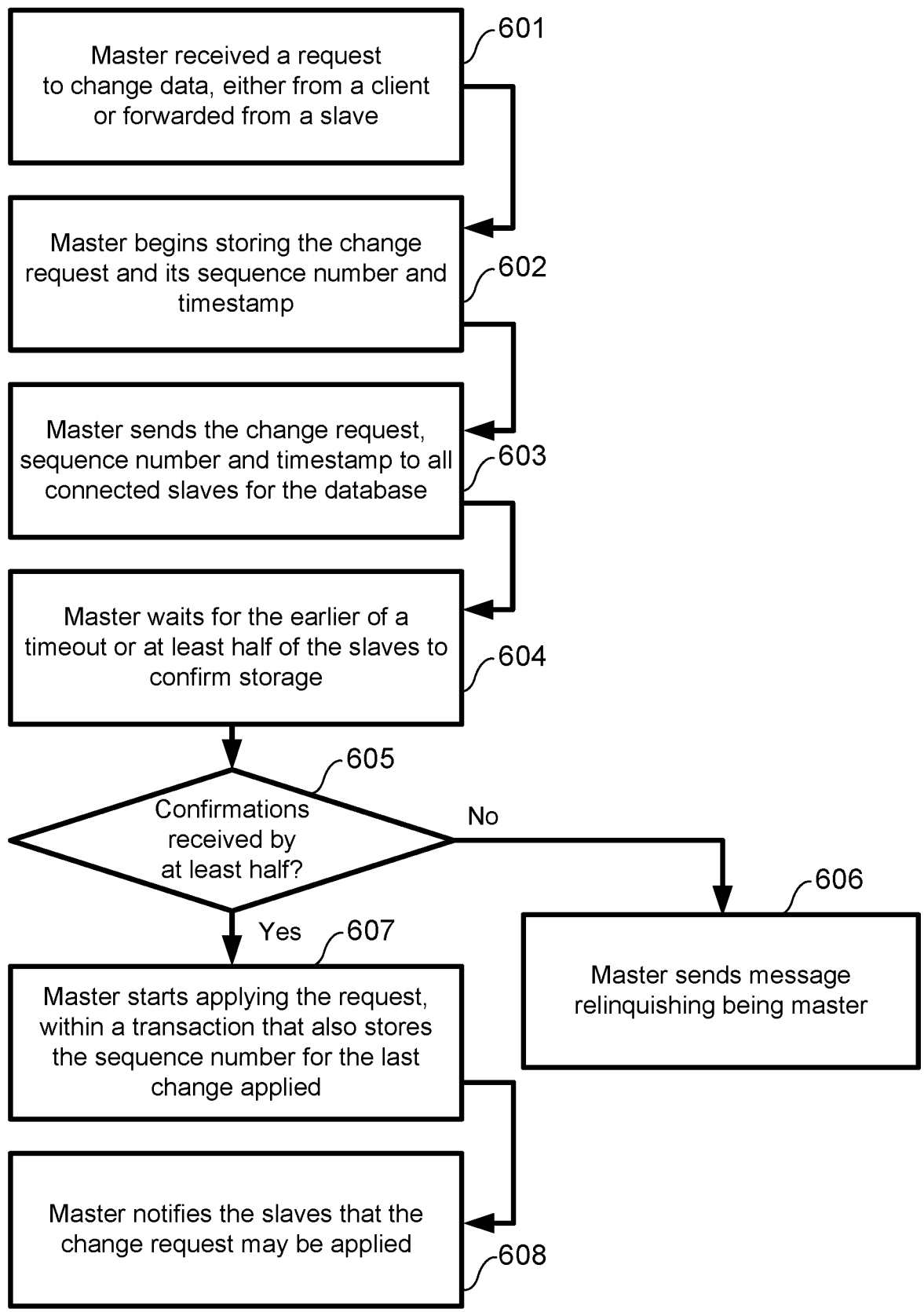
FIG. 6 is a flowchart illustrating the actions of the software, when acting as a data set's replication master, after receiving a request to change data, either from a client or forwarded from a slave, in accordance with an embodiment of the present disclosure.

FIG. 6 is a flowchart illustrating the actions of a master, after receiving a request to change data, either from a client or forwarded from a slave. After receiving a change request (601), the master will assign the next sequence number and timestamp to the change request, and start storing them (602) into its replica. The master then sends a message, containing the change request and its sequence number and timestamp, to all slaves of that data set (603). The master sets a timer and receives response messages from the slaves (604). If the timer goes off before a response has been received from at least half (605) of the data set's slaves, then the master will relinquish being a master, and so notify (606) all of the data set's slaves. If, on the other hand, a response has been received from at least half of the data set's slaves before the timer goes off, indicating that those slaves have successfully stored the new change request into their replica, and the master has completed storing the change request into its replica, then the master will cancel the timer, start applying the change request to its replica, within an ACID transaction that also updates that replica's highest sequence number applied (607), and send a message (608) to each slave, that indicates that the new change request may be applied after all lower-numbered sequence numbers have been applied to their replica.

Figure 7:
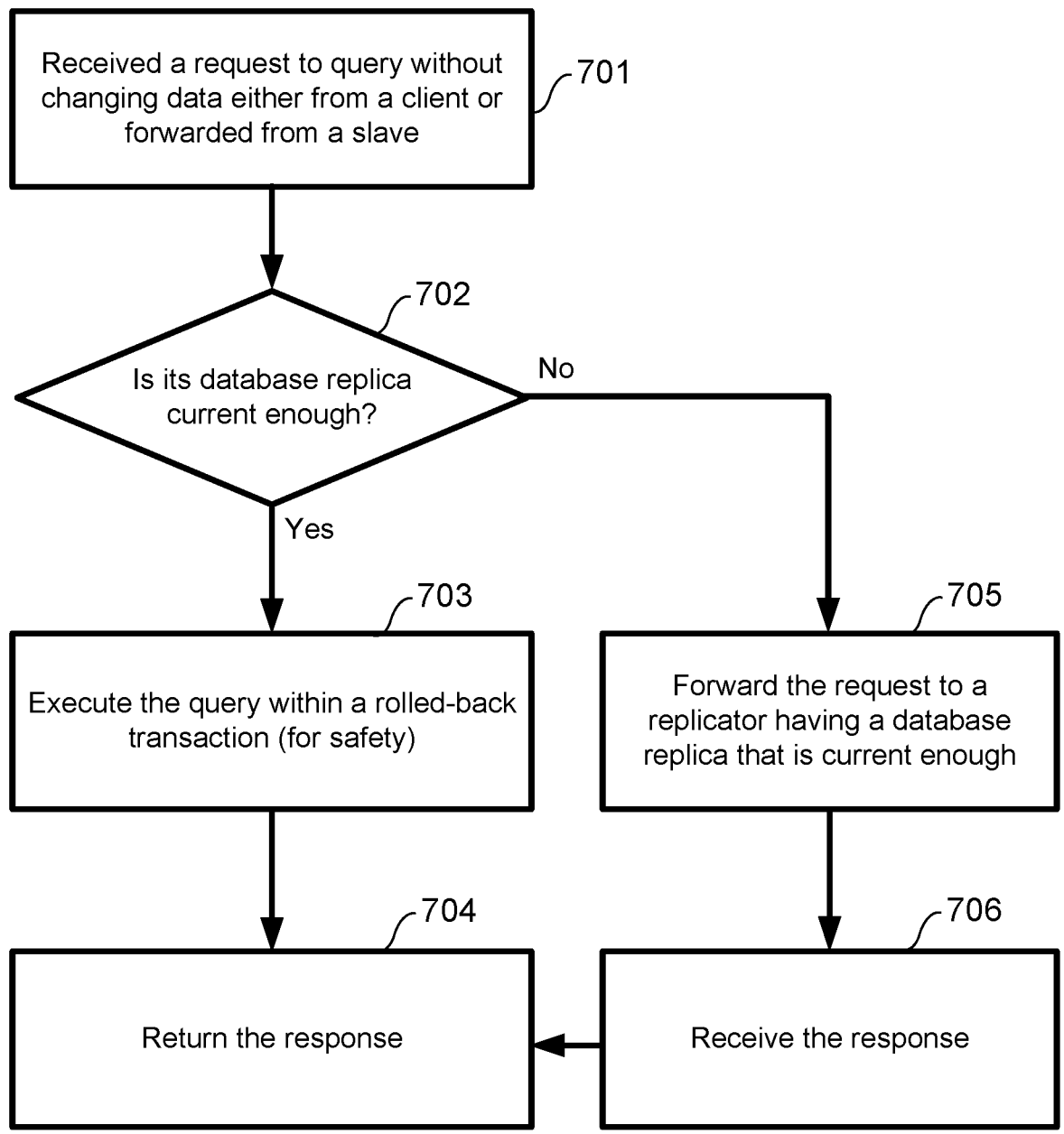
FIG. 7 is a flowchart illustrating the actions of the software, after receiving a request to query without changing data, either from a client or forwarded from a slave, in accordance with an embodiment of the present disclosure.

FIG. 7 is a flowchart illustrating the actions of a replicator, after receiving a request to query without changing data, either from a client or forwarded from a slave. After receiving (701) a query request, which will contain the maximum amount of time that the replica of the replicator may be lagging behind, if that replicator's replica is current enough (702) to satisfy the request, it will execute (703) the query within a rolled-back transaction to assure that the query doesn't modify data, and then return the results (704) of the query. If, on the other hand, the replicator's replica is lagging too far behind (702) to satisfy the request, the replicator will forward the request to another replicator that is able to satisfy (705) the request, and when it receives the response from that other replicator (706), it will then be returned to the requestor.

FIG. 8 depicts several starting conditions for the replicators of a data set, for the purpose of describing several problematic edge cases, and how they are resolved. First Table (801) presents a current state of a data set replicated by a group of five replicators. In this case, replicators "1," "2" and "3" had been communicating, with replicator "1" acting as the master, and replicators "4" and "5" had been offline for a while. The master had received a change request, assigned sequence number "101" to it, stored it in its replica, sent it to replicators "2" and "3," and replicators "2" and "3" stored it and notified the master that it was stored. The master then applied that change, and started to send out the notification to the slaves, that the change could be applied. However, consider the case in which replicator "1" went offline before that notification could be sent. Now consider that the next time that a quorum of replicators is connected, it consists of replicators "2," "4" and "5." Because these replicators are aware that change request "101" had been stored, they must assume that it may have been applied to one of the offline replicators, which is true in this case, since it had been applied by replicator "1." Eventually, each replicator will receive this change request, store it, and apply it to its replica.

Second table (802) presents another case, similar to the previous case, but in which change request "101" was stored by replicator "1", the master, but then that replicator went offline before that change request could be sent to any slaves. This starting condition is used below to describe two edge cases, and how they are resolved.

Consider that the next time that a quorum of replicators is connected, it consists of replicators "3," "4" and "5." This time, because these replicators are aware that change request "100" had been stored, they must assume that it may have been applied by one of the offline replicators, which is true in this case, since it had been applied by replicators "1" and "2." However, these online replicators are not aware of change request "101." After a master is determined from among these online replicators, and it receives a new change request, it will assign sequence number "101" to it, and it will be processed among the online replicators. At this point, the change request "101" that is stored in replica "1" (replicator "1's" replica of this data set) is different than the change request "101" that is stored in replicas "3," "4" and "5." Now consider that sometime later, replicator "1" comes online. Before it applies the change request it has stored with its highest sequence number, "101", it compares the timestamp it has stored for that change with the timestamp of another connected replicator where it was applied, and when it sees that the timestamp it has for "101" is different than what's in the other replicator, it deletes its change request "101" in its replica, and proceeds as normal, which will result in it receiving the new change request "101" from another replicator, storing it, and eventually applying it. Instead of using timestamps, globally-unique identifiers could have been used to resolve this issue, but since timestamps are used to resolve another issue, this embodiment uses timestamps.

Another case can occur. Again, starting from the condition depicted by second table (802), consider that the next time that a quorum of replicators is connected, it consists of replicators "2," "3" and "4," with replicator "2" as the master. When the master receives a new change request, it stores it with sequence number "101," but consider that the master then went offline before the new change request could be sent to the others. At this point, the change request "101" stored in replica "1" has an earlier timestamp than the change request "101" stored in replica "2." Now consider that a new quorum is created with replicators "1," "2" and "3." After the master examines the change requests stored among the quorum's replicas, it must assume that the change request "101" on replica "2" may have been applied by replicator "4" or "5," so it is sent among the replicators of the current quorum to store and eventually apply. The master knew that the change request "101" in replica "1" could not have been applied by any replicators, because the change request "101" in replica "2" had a more recent timestamp, and it could not have been created if it had been possible that the change request "101" in replica "1" could have been applied to any replicas.

FIG. 9 depicts several progressive conditions of the replicators of a data set, for the purpose of describing a problematic edge case, and how it is resolved. As depicted in Third table (901), a quorum consisted of replicators "1," "2" and "3," a new change request was received by the master (which could have been replicator "1" or "2"), and it was assigned request "101", stored by the master, sent out to the others, but replicator "3" disconnected before storing it. Fourth Table (902) shows the conditions a couple of minutes later, after a new quorum was formed by replicators "3," "4" and "5." These replicators were unaware of the change request "101" that was stored in replicas "1" and "2." When a new request was received by master replicator "4", and it was assigned request "101," stored by the master, sent out to the others, but replicator "5" disconnected before storing it. At this point, if a new quorum had been formed that was aware of both versions of change request "101," the master would have taken the version with the more recent timestamp, stored it, and sent it to the others to be stored, and eventually applied. Consider instead that a quorum was formed with replicators "1," "2" and "5," and they are unaware of the newer change request "101" that is stored in replicas "3" and "4." Fifth Table (903) shows the condition after replica "1," the master, noticed that change request "101" hadn't been applied, which it then sent to the others, and after it was stored by each replica of the quorum, replicator "1" started applying it to its replica, and sent out a message to the others indicating that change request may be applied (after all prior changes have been applied). However, consider that a network error took replicator "1" offline before that message could be sent. The key point is that when replicator "1," as the master, sent out what had been the older change request "101," it assigned a new timestamp, which was stored with that change request within replicas "1," "2" and "5." Had that not been the case, then if a new quorum was then formed, such as replicators "3," "4" and "5," the new master would be aware of the two versions of change request "101," but would have sent out the one having the newer timestamp, which would have eventually resulted in replica "1" having applied the older version of change request "101", and replicas "3," "4" and "5" having the newer version applied, which is a condition that should never be allowed. Instead, because the change request "101" in replica "5" has a newer timestamp, it will be sent out and eventually applied to replicas "3," "4" and "5," which is the desired result.

Exemplary Implementation

Figure 10:
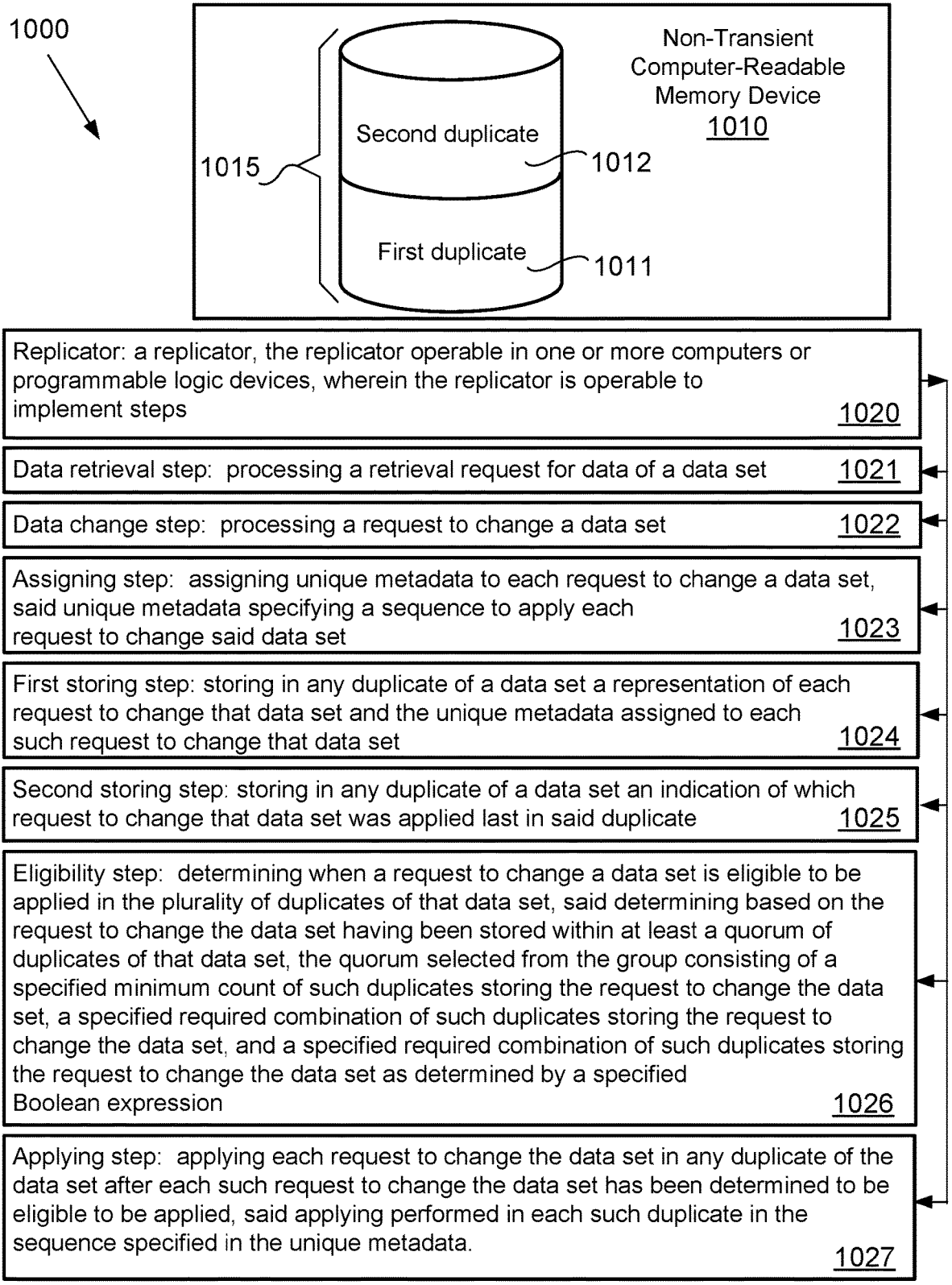
FIG. 10 illustrates a preferred embodiment of the data replication system.

FIG. 10 illustrates a preferred implementation of a system (1000) for improving computer operations and data safety. The system (1000) is used to enable data replication with improved data loss prevention and time to recovery. This system (1000) preferably includes a plurality of duplicates (1015) of a data set; a non-transient computer-readable memory device (1010); and a replicator (1020).

While one computer or at least one non-transitory memory storage device could serve as the holder of multiple duplicates of the same data set, it is preferred that the plurality of duplicates (1015) of a data set are stored on independently-controlled non-transitory memory storage devices controlled by a multiplicity of computers, preferably far apart from each other so that a disaster or power failure in one region will not affect the availability of the other duplicates in the plurality of duplicates found in other distant regions.

For purposes of explaining this preferred embodiment, reference is made to a first duplicate (1011) and a second duplicate (1012), which are identified only to permit a discussion of what happens when the data in one of the duplicates is modified. Thus, the plurality of duplicates (1015) preferably includes the first duplicate (1011) and the second duplicate (1012), preferably among other duplicates. A goal for the system (1000) is that each duplicate will be identical, except for data in each duplicate for facilitating replication, but in which duplicates could differ at any moment based on each duplicate's current state of replication, or unintentionally caused by the application of non-deterministic change requests, or data retrieval requests that attempt to alter data.

In one embodiment, there is only one non-transient computer-readable memory device (1010). This memory device might be partitioned or otherwise formatted for storing multiple duplicates. This means, for example, that this embodiment could be performed using one computer and hard drive storing multiple duplicates. However, in preferred embodiments there are a multiplicity of memory devices, where each such memory device stores at least one duplicate or portion of one duplicate in the plurality of duplicates (1015). The term "non-transitory" is used to distinguish over a transitory signal. Non-transitory may refer to permanent storage or to computer-readable media that stores data for short periods or in the presence of power such as a memory device or Random Access Memory. In this context, the non-transient computer-readable memory device (1010) includes any hardware device, such as, for example, a Random Access Memory, a flash drive, a hard drive, a compact disk, a USB drive, and a DVD drive.

The replicator (1020) is either a physical component or software. It may be a combination of hardware and software. If implemented as a computer-implemented apparatus, the replicator (1020) is implemented using an electronic chip that performs all of the steps and functions described for it herein. The replicator (1020) could be included in an article of manufacture, such as for example, in one or more computer program products. This could be a physical computer chip with digital circuits dedicated and designed exclusively to implement the steps and functions for the replicator (1020), or it could be a physical device in the form of computer useable media holding software which when executed, performs said steps and functions. The replicator (1020) could be included as part of a computer system, consisting of multiple replicas of a customer's database. Alternatively, the replicator could be sold separately, or provided as a service in the use of the system (1000).

Figure 13:
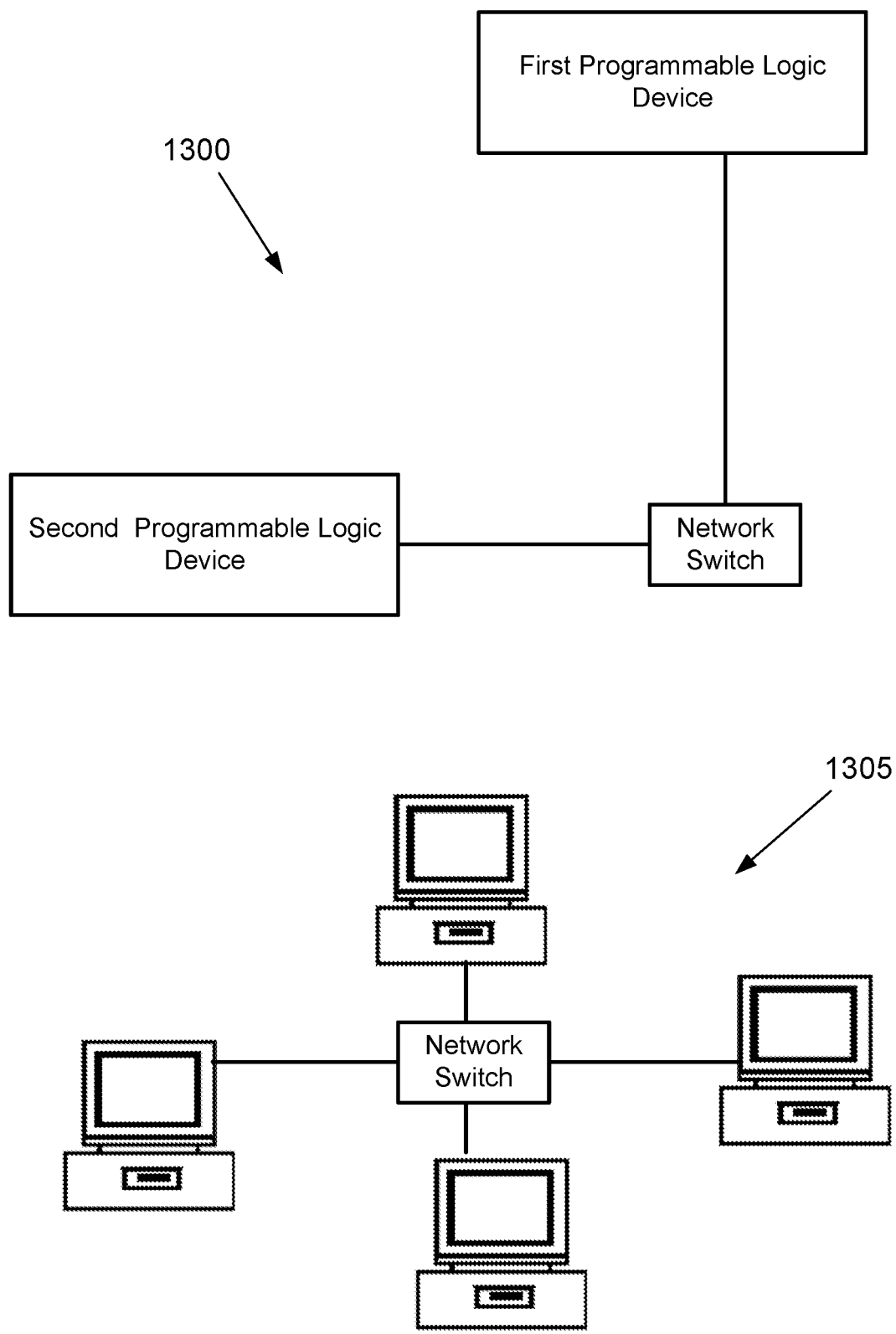
FIG. 13 illustrates an exemplary network connecting a computer or programmable logic device used in preferred embodiments of the data replication system disclosed herein.

Preferably, the replicator (1020) is operable in one or more computers (1305) or one or more programmable logic devices (1300), as illustrated in FIG. 13. While a computer is a ubiquitous and well-known device, the system (1000) can be performed on an integrated circuit that provides less than the full functionality of a modern computer: Such an integrated circuit is a programmable logic device. A programmable logic device is an electronic component used to build configurable digital circuits. A programmable logic device is an integrated circuit that can be programmed using a hardware description language, such as VHDL, VERILOG, CUPL or ADA. It is well known in the art that using available tools one can design and program the programmable logic device.

Preferably, as shown in FIG. 10, the replicator (1020) is operable to implement steps that include a data retrieval step (1021); a data change step (1022); an assigning step (1023);

a first storing step (1024); a second storing step (1025); an eligibility step (1026); and an applying step (1027).

The data retrieval step (1021) is processing a request for data of a data set. The replicator (1020) is connected to one or more of the duplicates either directly on the same computer or programmable logic device or remotely via a network connection, such as a closed network or an Internet connection. The data retrieval step (1021) is therefore the replicator (1020) responding to a client making a request for data that may be present in a duplicate to which the replicator can access.

The data change step (1022) is processing a request to change a data set. The data change step (1022) essentially requires the replicator (1020) to act on a command from a client to change a portion of the data in a data set.

The assigning step (1023) is assigning unique metadata to each request to change a data set, said unique metadata specifying a sequence to apply each request to change said data set.

The first storing step (1024) is storing in any duplicate of a data set a representation of each request to change that data set and the unique metadata assigned to each such request to change that data set.

The second storing step (1025) is storing in any duplicate of a data set an indication of which request to change that data set was applied last in said duplicate. The second storing step (1025) would preferably occur after the applying step (1027).

The eligibility step (1026) is determining when a request to change a data set is eligible to be applied in the plurality of duplicates (1015) of that data set, said determining based on the request to change the data set having been stored within at least a quorum of duplicates (1015) of that data set, the quorum selected from the group consisting of a specified minimum count of such duplicates storing the request to change the data set, a specified required combination of such duplicates storing the request to change the data set, and a specified required combination of such duplicates storing the request to change the data set as determined by a specified Boolean expression.

The applying step (1027) is applying each request to change the data set in any duplicate of the data set after each such request to change the data set has been determined to be eligible to be applied, said applying performed in each such duplicate in the sequence specified in the unique metadata.

An optional unique metadata limitation (1123), shown in FIG. 11, involves including a timestamp in the unique metadata of each request to change the data set. This limitation also specifies that the replicator (1020) is further operable to implement a step performed after any duplicate in the plurality of duplicates (1015) of the data set has become accessible by the replicator (1020) such that: if the replicator (1020) is able to access information of at least a quorum of the duplicates (1015) of the data set, and if any such duplicate contains a request to change the data set that has not been applied on any of the duplicates (1015) of the data set that are so accessible, and if the timestamp in the unique metadata of such a request to change the data set is newer than that of every request to change the data set that has already been applied on every such duplicate, and if said timestamp is newer than that of every request to change the data set that has not already been applied on every such duplicate, then such request to change the data set is processed as if it were the latest in the sequence; and if any other duplicates (1015) in the plurality of duplicates (1015) of the data set are not so accessible, then the unique metadata of such request to change the data set is assigned a new current timestamp.

An optional request preclusion step (1120), shown in FIG. 11, provides that the replicator (1020) is further operable to implement a step comprising preventing applying, in any duplicate in the plurality of duplicates (1015) of a data set, any request to change the data set that has not been applied in any such duplicate and that predates any later request to change the data set that has been applied in any such duplicate. This step may be supplemented by a step of deleting from any duplicate in the plurality of duplicates (1015) of a data set any request to change the data set that has not been applied and that predates any later request to change the data set that has been applied in any duplicate of that data set.

An optional changes limitation (1220), shown in FIG. 12, specifies that the replicator (1020) is operable to perform steps that include applying in any duplicate of any data set each request to change that data set; and storing an updated indication that shows that said request to change that data set was applied last in said duplicate; and wherein said applying step and said storing step are undertaken within a single atomic transaction.

An optional time lag limitation (1221) specifies that the retrieval request for data of a data set is subject to a limitation of a maximum amount of time that the duplicate used for a response may be lagging behind in having applied past requests to change that data set. This maximum may be set using one or more of a variety of steps, including as examples:

a request value (1222), which is a value within the retrieval request, a last value (1223), which is a value sent in the last retrieval request which contained such a value. The last value (1223) re-used for any subsequent retrieval request that does not contain any such value, a message value (1224), which is a value sent in a message which sets a default for any subsequent retrieval request that does not contain such a value, a requestor value (1225), which is a value stored in the data set, which is for a particular requestor or for a group of requestors in which the particular requestor is a member, and which is used when no such value has been sent in any message, a data set value (1226), which is a value stored in the data set, which is used when no other value has been sent in any message, and when no such value is stored for a particular requestor or any group of requestors in which the particular requestor is a member, and [0118] a default value (1227), which is a value used when no such value is stored in the data set and when no such value has been sent in any message.

The above-described embodiments, including the drawings, are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the data management and data storage industries.

What is claimed is:

1. A system for improving computer operations and data safety, the system enabling data replication with improved data loss prevention and time to recovery, the system comprising:
   a plurality of duplicates of a data set, the plurality of duplicates comprising a first duplicate and a second duplicate, wherein the first duplicate may be changed so that the data set on the first duplicate no longer exactly matches the data set on the second duplicate;
   a non-transitory memory storage device storing at least one portion of a duplicate in the plurality of duplicates;
   a replicator, the replicator operable in one or more computers or programmable logic devices, wherein the replicator is operable to implement steps comprising:
   processing a retrieval request for data of the data set;
   processing a request to change the data set;
   assigning unique metadata to each request to change the data set, said unique metadata specifying a sequence to apply each request to change said data set;
   storing in any duplicate of the data set a representation of each request to change that data set and the unique metadata assigned to each such request to change that data set;
   storing in any duplicate of the data set an indication of which request to change that data set was applied last in said duplicate;
   determining when a request to change the data set is eligible to be applied in the plurality of duplicates of the data set, said determining based on the request to change the data set having been stored within at least a quorum of duplicates of the data set, the quorum selected from the group consisting of
      a specified minimum count of such duplicates storing the request to change the data set,
      a specified required combination of such duplicates storing the request to change the data set, and
      a specified required combination of such duplicates storing the request to change the data set as determined by a specified Boolean expression; and
   applying each request to change the data set in any duplicate of the data set after each such request to change the data set has been determined to be eligible to be applied, said applying performed in each such duplicate in the sequence specified in the unique metadata.

2. The system of claim 1, wherein the unique metadata, which is assigned to each request to change the data set, comprises a timestamp, and wherein the replicator is further operable to implement a step performed after any duplicate in the plurality of duplicates of the data set has become accessible by the replicator such that:
   if the replicator is able to access information of at least a quorum of the duplicates of the data set, and
   if any such duplicate contains a request to change the data set that has not been applied on any of the duplicates of the data set that are so accessible, and
   if the timestamp in the unique metadata of such a request to change the data set is newer than that of every request to change the data set that has already been applied on every such duplicate, and
   if said timestamp is newer than that of every request to change the data set that has not already been applied on every such duplicate,
   then such request to change the data set is processed as if it were the latest in the sequence, and
   if any other duplicates in the plurality of duplicates of the data set are not so accessible, then the unique metadata of such request to change the data set is assigned a new current timestamp.

3. The system of claim 1, wherein the replicator is further operable to implement a step comprising preventing applying, in any duplicate in the plurality of duplicates of a data set, any request to change the data set that has not been applied in any such duplicate and that predates any later request to change the data set that has been applied in any such duplicate.

4. The system of claim 1, wherein the replicator is further operable to perform steps comprising:
   applying in any duplicate of the data set each request to change the data set; and
   storing an updated indication that shows that said request to change the data set was applied last in said duplicate; and
   wherein said applying step and said storing step are undertaken within a single atomic transaction.

5. The system of claim 1, in which the retrieval request for data of the data set is subject to a limitation of a maximum amount of time that the duplicate used for a response may be lagging behind in applying change requests, the limitation selected from the group consisting of
   a value within the retrieval request,
   a value, sent in the retrieval request which contained such a value, that is re-used for any subsequent retrieval request that does not contain any such value,
   a value sent in a message which sets a default for any subsequent retrieval request that does not contain such a value,
   a value stored in the data set, which is for a particular requestor or for a group of requestors in which the particular requestor is a member, and which is used when no such value has been sent in any message,
   a value stored in the data set, which is used when no other value has been sent in any message, and when no such value is stored for a particular requestor or any group of requestors in which the particular requestor is a member, and
   a value used when no such value is stored in the data set and when no such value has been sent in any message.

* * * * *